United States Patent [19]

Yoshimura et al.

[11] Patent Number: 5,349,885
[45] Date of Patent: Sep. 27, 1994

[54] HYDRAULIC CONTROL SYSTEM FOR CONTROLLING LINE PRESSURE BASED ON BACKTORQUE AND THROTTLE RATE IN AN AUTOMATIC TRANSMISSION

[75] Inventors: Hiroshi Yoshimura; Kazuo Sasaki; Kenji Kurisu; Takuji Fujiwara; Mitsutoshi Abe, all of Hiroshima, Japan

[73] Assignee: Mazda Motor Corporation, Hiroshima, Japan

[21] Appl. No.: 936,203

[22] Filed: Aug. 27, 1992

[30] Foreign Application Priority Data

Sep. 3, 1991 [JP] Japan ................. 3-222580
Nov. 15, 1991 [JP] Japan ................. 3-300732

[51] Int. Cl.$^5$ ............................................. F16H 5/66
[52] U.S. Cl. ...................... 477/61; 364/424.1; 477/69; 477/159; 477/162
[58] Field of Search ............... 364/424.1; 74/861, 866

[56] References Cited

U.S. PATENT DOCUMENTS

| | | | |
|---|---|---|---|
| 4,283,970 | 8/1981 | Vukovich | 74/861 X |
| 4,584,905 | 4/1986 | Eschrich et al. | 74/861 |
| 4,890,515 | 1/1990 | Taniguchi et al. | 74/861 X |
| 4,939,957 | 7/1990 | Asano et al. | 74/866 |
| 4,955,259 | 9/1990 | Narita | 74/866 |
| 5,020,391 | 6/1991 | Aoki et al. | 74/866 |
| 5,079,971 | 1/1992 | Yoshimura et al. | 74/866 |
| 5,150,634 | 9/1992 | Wakahara | 74/866 |

FOREIGN PATENT DOCUMENTS 57-47056  3/1982  Japan.

*Primary Examiner*—Leslie A. Braun
*Assistant Examiner*—Khoi Ta
*Attorney, Agent, or Firm*—Sixbey, Freidman, Leedom & Ferguson

[57] ABSTRACT

An automatic transmission includes a multi-speed transmission gear mechanism having an input shaft, an output shaft and a plurality of friction coupling elements. A hydraulic control system selectively supplies a hydraulic pressure to the friction coupling elements, thereby selectively applying the friction coupling elements to cause the transmission gear mechanism to shift to a speed which is determined according to a predetermined shift pattern. The control system sets a target hydraulic pressure to be applied to the friction coupling elements according to the kind of the shift to be effected and the engine load, and, when it is detected that the transmission gear mechanism is to make a backout upshift due to reduction in the engine load, increases the target hydraulic pressure by an amount which is determined according to the throttle opening and the turbine speed.

25 Claims, 12 Drawing Sheets

FIG. 2
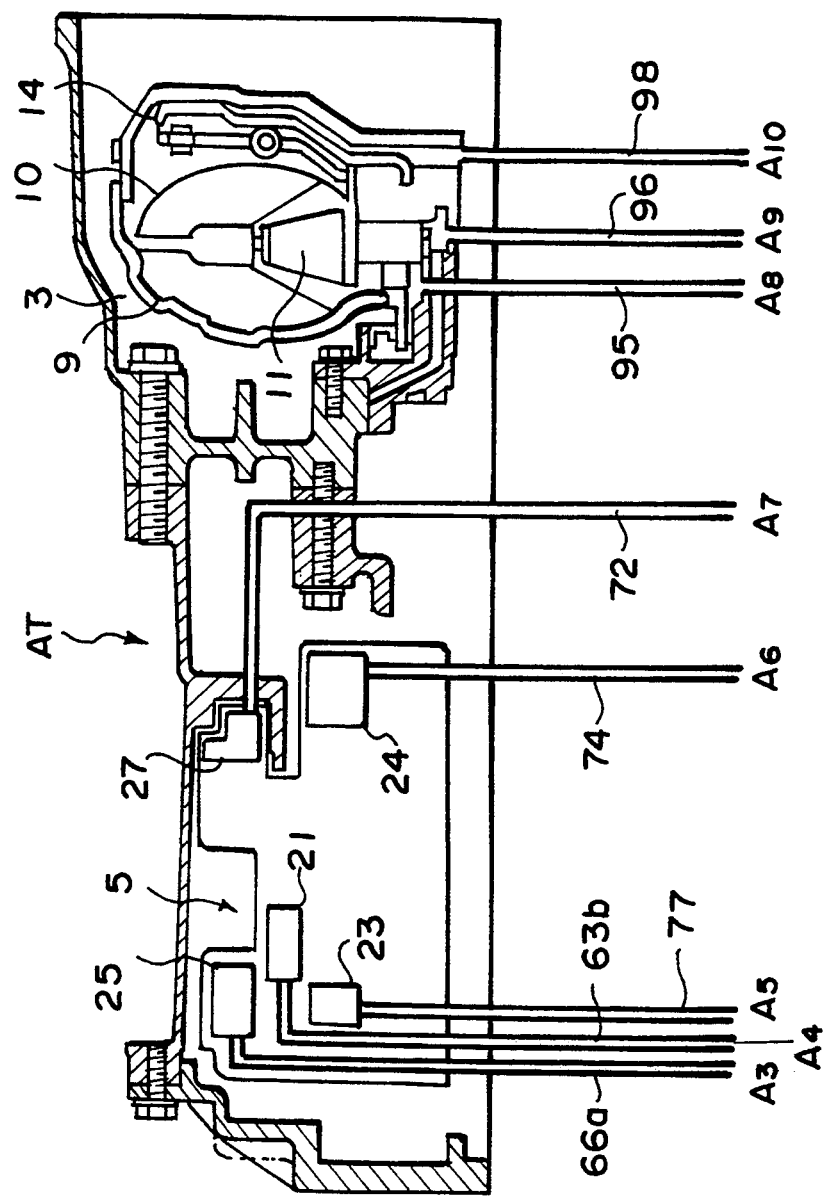
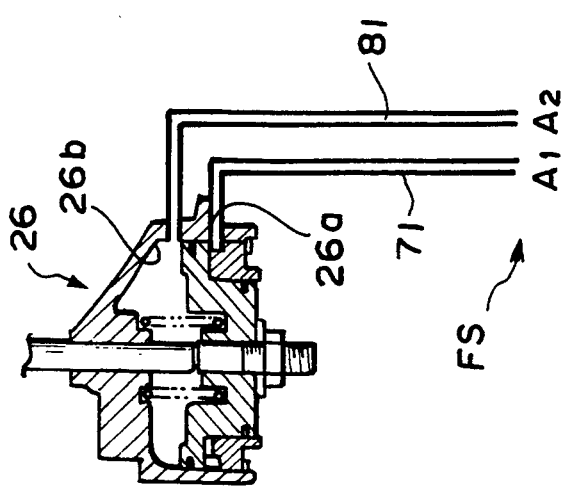

FIG. 10A (FOR FIRST PATTERN)

| Nt / TVO | 3000 | 4000 | 5000 | 6000 | 7000 |
|---|---|---|---|---|---|
| 0/8 | (K1) | | | | →INCREASE |
| 1/8 | ↓ | --- | --- | --- | --- |
| 2/8 | INCREASE | --- | --- | --- | --- |

FIG. 10B (FOR SECOND PATTERN)

| Nt / TVO | 3000 | 4000 | 5000 | 6000 | 7000 |
|---|---|---|---|---|---|
| 0/8 | (K2) | | | | →INCREASE |
| 1/8 | ↓ | --- | --- | --- | --- |
| 2/8 | INCREASE | --- | --- | --- | --- |

FIG.11A (FOR UPSHIFT TO SECOND)

| TVO \ Nt | 3000 | 4000 | 5000 | 6000 | 7000 |
|---|---|---|---|---|---|
| 0/8 | ($K_{11}$) | | | | → INCREASE |
| 1/8 | | --- | --- | --- | --- |
| 2/8 | ↓ INCREASE | --- | --- | --- | --- |

FIG.11B (FOR UPSHIFT TO THIRD)

| TVO \ Nt | 3000 | 4000 | 5000 | 6000 | 7000 |
|---|---|---|---|---|---|
| 0/8 | ($K_{12}$) | | | | → INCREASE |
| 1/8 | | --- | --- | --- | --- |
| 2/8 | ↓ INCREASE | --- | --- | --- | --- |

FIG.11C (FOR UPSHIFT TO FOURTH)

| TVO \ Nt | 3000 | 4000 | 5000 | 6000 | 7000 |
|---|---|---|---|---|---|
| 0/8 | ($K_{13}$) | | | | → INCREASE |
| 1/8 | | --- | --- | --- | --- |
| 2/8 | ↓ INCREASE | --- | --- | --- | --- |

| KIND OF SHIFT \ THROTTLE OPENING | 0/8 | 1/8 | 2/8 | 7/8 | 8/8 |
|---|---|---|---|---|---|
| 1 → 2 | (PLo) | --- | --- | --- | --- |
| 1,2 → 3 | --- | --- | --- | --- | --- |
| 1,2,3 → 4 | --- | --- | --- | --- | --- |

HYDRAULIC CONTROL SYSTEM FOR CONTROLLING LINE PRESSURE BASED ON BACKTORQUE AND THROTTLE RATE IN AN AUTOMATIC TRANSMISSION

BACKGROUND OF THE INVENTION

1. Field of the Invention

This invention relates to a hydraulic control system for an automatic transmission, and more particularly to a hydraulic control system which selectively applies and releases a plurality of friction coupling elements of an automatic transmission.

2. Description of the Prior Art

Generally an automatic transmission comprises a torque converter and a multi-speed transmission gear mechanism consisting of, for instance, planetary gears. The transmission gear mechanism has a plurality of friction coupling elements such as clutches and brakes for changing power transmission paths in the gear mechanism and the friction coupling elements are caused to engage or disengage by a hydraulic control system.

In an electronic control automatic transmission having an electronic control unit, gear-shifting is effected according to an upshift map in which 1-2 upshift line, 2-3 upshift line and 3-4 upshift line are set using throttle opening and turbine speed (or vehicle speed) as parameters and a downshift map in which 2-1 downshift line, 3-2 downshift line and 4-3 downshift line are set using throttle opening and turbine speed (or vehicle speed) as parameters. The upshift map and the downshift map are stored in a built-in memory in the control unit.

If the line pressure of the hydraulic control system upon a gear-shifting is too high, the friction coupling elements are abruptly engaged and shift shock is generated and if the line pressure is too low, gear-shifting requires a long time and the friction coupling elements wear abnormally or generate heat.

In order to avoid such problems, there has been proposed a hydraulic control system as disclosed, for instance, in Japanese Patent Publication No. 61(1986)-148021 in which the line pressure upon a gear-shifting is set according to the engine load (as represented, for instance, by the throttle opening) and the kind of gear-shifting (e.g., from which gear speed to which gear speed). In the system, a map such as shown in FIG. 12 is prepared and the line pressure PLo is set with reference to the map.

However when the line pressure PLo is set in such a manner, the following problem arises in the case of a backout shift, i.e., an upshift due to reduction of the engine load. That is, when the amount of depression of the accelerator pedal is reduced so that the throttle opening is reduced from a value a to a value b as shown by arrow x in FIG. 13, whereby the operating condition determined on the basis of the relation between the throttle opening and the turbine speed moves across the upshift line shown in FIG. 13 to a range where the transmission should upshift, the line pressure PLo determined according to the map shown in FIG. 12 is equal to that which should be selected when the operating condition moves across the upshift line as shown by arrow y at a point c the throttle opening at which is equal to the value b. The upshift to be made when the operating condition moves in the manner shown by the arrow x must be made at a turbine speed higher than that at which the upshift is made when operating condition moves in the manner shown by the arrow y. Since the change in inertia of the transmission and the engine becomes larger as the turbine speed increases, the line pressure PLo determined according to the map shown in FIG. 12 is too low for the former upshift and the upshifting time is elongated.

In order to overcome this problem, in the control system disclosed, for instance, in Japanese Unexamined Publication of Translated version 58(1983)-501477, the line pressure is set on the basis of the engine torque and the engine speed at the time the gear-shifting is to be made.

However, since the control unit for controlling the automatic transmission is generally separate from the control unit for controlling the engine, in order for the control unit for the automatic transmission to obtain data on the engine torque, the control units must be connected through many signal lines, and at the same time, a lot of controlling data based on various basic experiments are required. Thus the system disclosed in the publication identified above is difficult to put into practice though it can provide a relatively fine control.

SUMMARY OF THE INVENTION

In view of the foregoing observations and description, the primary object of the present invention is to provide a hydraulic control system for an automatic transmission which can properly set the line pressure during a backout or back torque shift.

The hydraulic control system of the present invention has a backout shift detecting means which detects that the transmission gear mechanism is to make a backout upshift due to reduction in the engine load by a predetermined amount, and a correcting means which, when the backout shift detecting means detects that the transmission gear mechanism is to make a backout upshift due to reduction in the engine load, increases a target hydraulic pressure set according to the kind of the shift to be effected and the engine load by an amount which is determined according to the torque to be transmitted through the automatic transmission and the rotational speed of the driving system.

The torque to be transmitted through the transmission may be detected by way of an engine load, for instance, the throttle opening. The rotational speed of the driving system may typically be the turbine speed.

Though the amount by which the target hydraulic pressure is increased may be determined solely according to the torque to be transmitted through the automatic transmission and the rotational speed of the driving system, it is preferred that it be determined according to the kind of the backout shift as well as to the torque to be transmitted through the automatic transmission and the rotational speed of the driving system.

The kinds of the backout shifts may be divided, for instance, according to the gear speeds before and after the backout shift, or to the gear speed after the backout shift or the friction coupling element(s) which is applied in the backout shift.

BRIEF DESCRIPTION OF THE DRAWINGS

FIGS. 2 to 6 are views respectively showing parts of a hydraulic system employed in the automatic transmission, FIGS. 10A and 10B are correction coefficient maps employed in the first embodiment, FIGS. 11A to 11C are correction coefficient maps employed in the second embodiment.

DESCRIPTION OF THE PREFERRED EMBODIMENTS

Figure 1:
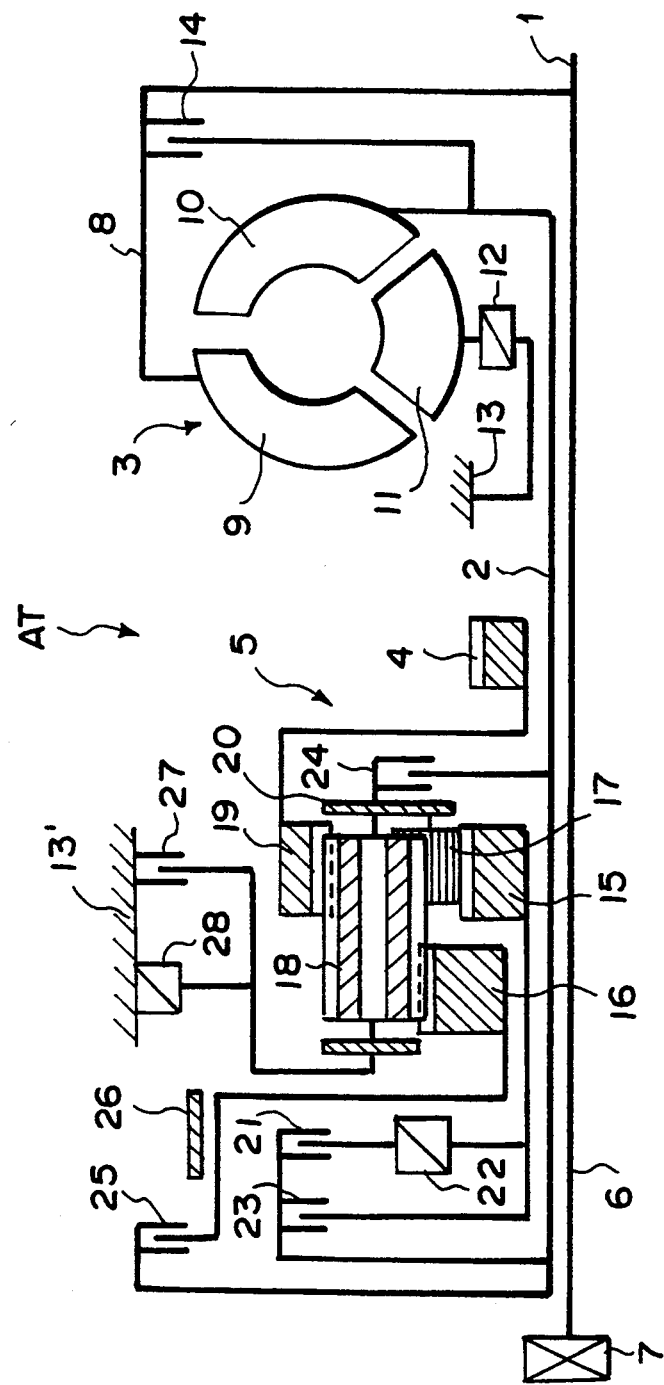
FIG. 1 is a schematic view showing an automatic transmission to which the present invention is applied.

In FIG. 1, an automatic transmission AT comprises a torque converter 3 and a transmission gear mechanism 5. Reference numeral 1 denotes an engine output shaft, reference numeral 2 denotes a turbine shaft and reference numeral 4 denotes an output gear of the transmission gear mechanism 5. The turbine shaft 2 is in the form of a pipe, and a pump shaft 6 extends through the turbine shaft 2. An oil pump 7 disposed behind the transmission gear mechanism 5 is driven through the pump shaft 6.

The torque converter 3 comprises a pump 9 connected to the engine output shaft 1 by way of a connecting member 8, a turbine 10 which is connected to the turbine shaft 2 and is driven by working oil discharged from the pump 9 and a stator 11 which redirects the working oil from the turbine 10 back into the pump 9 in a helping direction. The torque converter 3 multiplies the torque of the engine output shaft 1 at a ratio according to the difference in speed between the pump 9 and the turbine 10. The stator 11 is fixed to a transmission casing 13 by way of a stator one way clutch 12. Reference numeral 14 denotes a lockup clutch for directly connecting the engine output shaft 1 and the turbine shaft 2 not by way of the torque converter 3.

The transmission gear mechanism 5 is of known planetary gear sets and comprises a small sun gear 15 which is loosely fitted on the turbine shaft 2, a large sun gear 16 which is loosely fitted on the turbine shaft 2 behind the small sun gear 15, a plurality of short pinions 17, a long pinion 18 which is in mesh with the short pinions at its forward part and with the large sun gear 16 at its rearward part, a ring gear 19 in mesh with the long pinion 18 and a carrier 20 which supports for rotation the short pinions 17 and the long pinion 18.

In the transmission gear mechanism 5 with this arrangement, the small sun gear 15, the larger sun gear 16 or the carrier 20 functions as the input portion according to the gear speed and the ring gear 19 functions as the output portion irrespective of the gear speed. The output gear 4 is connected to the ring gear 19.

A plurality of clutches and brakes are provided in order to change torque transmission paths in the gear mechanism 5.

That is, a forward clutch 21 and a first one way clutch 22 are provided in series between the turbine shaft 2 and the small sun gear 15 and a coast clutch 23 is provided between the turbine shaft 2 and the small sun gear 15 in parallel to the clutches 21 and 22. A 3-4 clutch 24 is provided between the turbine shaft 2 and the carrier 20 and a reverse clutch 25 is provided between the turbine shaft 2 and the large sun gear 16. A 2-4 brake 26 in the form of a band brake which holds stationary the large sun gear 16 is provided between the large sun gear 16 and the reverse clutch 25. A low and reverse brake 27 which holds stationary the carrier 20 and a second one way clutch 28 which supports counterforce of the carrier 20 are provided in parallel between the carrier 20 and a transmission casing 13'.

The transmission gear mechanism 5 has for forward speeds and one reverse, and is shifted to a desired speed by selectively applying the clutches 21, 23, 24 and 25 and brakes 26 and 27 in the manner shown in the following table.

TABLE

| range | clutch ||||brake ||one way clutch ||
|---|---|---|---|---|---|---|---|---|
| | forward | coast | 3-4 | reverse | 2-4 | low & reverse | 1st | 2nd |
| P | | | | | | | | |
| R | | | | applied | | applied | | |
| N | | | | | | | | |
| D-1 | applied | | | | | | locked | locked |
| D-2 | applied | | | | applied | | locked | |
| D-3 | applied | applied | applied | | | | locked | |
| D-4 | applied | | | applied | applied | | | |
| 2-1 | applied | | | | | | locked | locked |
| 2-2 | applied | applied | | | applied | | locked | |
| 2-3 | applied | applied | applied | | | | locked | |
| 1-1 | applied | applied | | | | applied | locked | locked |
| 1-2 | applied | applied | | | applied | | locked | |

The hydraulic control system FS for the actuators of the friction coupling elements, i.e., the clutches and brakes, will be described with reference to FIGS. 2 to 6, hereinbelow.

The hydraulic control system FS comprises a line pressure control mechanism L, a hydraulic circuit M which supplies and discharges a hydraulic pressure to and from a plurality of members, a manual valve 31 which is shifted by a selector lever (not shown) to change the line pressure supply paths according to the position of the selector lever, three shift valves 33 to 35 which are shifted by a control unit 32 according to the position of the manual valve 31 and the operating condition of the vehicle such as determined by the turbine speed and the throttle opening, four accumulators 36 to 39 which damp supply and discharge of the hydraulic pressure to and from predetermined friction coupling elements, three timing valves 41 to 43 and a bypass valve 44 which control the timing of supply and discharge of the hydraulic pressure to and from predetermined friction coupling elements, a lockup control mechanism U which controls supply of the hydraulic pressure to the torque converter 3 and the lockup clutch 14, and a plurality of orifices and one way valves which adjust the flow resistance at predetermined portions in the hydraulic circuit M. The hydraulic control system FS shifts the transmission gear mechanism 5 by controlling the hydraulic pressures applied to the respective friction coupling elements according to the selected range (P, R, N, D, 2 or 1) and the operating condition of the vehicle. The 2-4 brake 26 is a servo piston type band brake having an apply port 26a and a release port 26b. When only the apply port 26a is applied with a hydraulic pressure, the 2-4 brake 26 is applied and when both the apply port 26a and the release port 26b are applied with hydraulic pressures, the 2-4 brake 26 is released. The other friction coupling elements are applied when hydraulic pressures applied thereto and released when the hydraulic pressures are released therefrom.

The line pressure control mechanism L has a pressure regulator valve 50 which basically generates in a line pressure supply passage 51 a line pressure proportional to a pilot pressure. The line pressure in the line pressure supply passage 51 is applied to the manual valve 31 and the like. The working oil in the line pressure supply passage 51 is supplied to the torque converter 3 from the pressure regulator valve 50 through a torque converter passage 53 having relief valve 52.

The pilot pressure supplied to the pressure regulator valve 50 is produced by a reducing valve 54, a modulator valve 55, a line pressure controlling accumulator 56 and a line pressure controlling solenoid valve 57 which is duty-controlled by the control unit 32.

More particularly, the line pressure in the line pressure supply passage 51 is reduced by the reducing valve 54 and then input into an input port 55a of the modulator valve 55 through a reduction passage 58. The hydraulic pressure in the reduction passage 58 is also introduced into a control port 55b of the modulator valve 55 through a duty pressure passage 59. The hydraulic pressure applied to the control port 55b is controlled by the line pressure controlling solenoid valve 57 which is opened and closed according to a duty ratio output from the control unit 32.

A hydraulic pressure corresponding to the hydraulic pressure applied to the control port 55b is output to a pilot pressure passage 61 as the pilot pressure from the modulator valve 55. Pulsation of the hydraulic pressure in the pilot pressure passage 61 is absorbed by the line pressure controlling accumulator 56. The pilot pressure thus produced is supplied to the pressure regulator valve 50, and a line pressure proportional to the pilot pressure is produced in the line pressure supply passage 51. The pilot pressure in the pilot pressure passage 61 is also supplied to a cutback valve 62 which will be described later.

The manual valve 31 is shifted by the selector lever (not shown) and selectively communicates the line pressure supply passage 51 with a hydraulic pressure supply passage. That is, the manual valve 31 communicates the line pressure supply passage 51 with first and second main hydraulic pressure supply passages 63 and 64 when it is in D-range or 2-range, with the first main hydraulic pressure supply passage 63 and a third main hydraulic pressure supply passage 65 when it is in 1-range and with a reverse hydraulic pressure supply passage 66 when it in R-range. The manual valve 31 communicates the line pressure supply passage 51 with none of the passages 63 to 66 when it is in P-range or N-range.

The first main hydraulic pressure supply passage 63 branches into a 1-2 shift valve hydraulic pressure passage 63a and a forward clutch hydraulic pressure passage 63b. The 1-2 shift valve hydraulic pressure passage 63a is connected to a first input port 33a of the 1-2 shift valve 33. The forward clutch hydraulic pressure passage 63b further branches and connected to a first input port 35a of the 3-4 shift valve 35 and to the forward clutch 21. The second main hydraulic pressure supply passage 64 is connected to a first input port 3a of the 2-3 shift valve 34. The third main hydraulic pressure supply passage 65 merges into a second branch hydraulic pressure supply passage 66b (to be described later) by way of a low reducing valve 67 and a ball valve 68 and then is connected to a second input port 33a of the 1-2 shift valve 33. The reverse hydraulic pressure supply passage 66 branches into a first branch hydraulic pressure supply passage 66a and a 1-2 shift valve hydraulic pressure passage 66b. The first branch hydraulic pressure supply passage 66a is connected to the reverse clutch 25 and the 1-2 shift valve hydraulic pressure passage 66b is connected to a second input port 33a of the 1-2 shift valve 33 by way of a ball valve 68.

Basically each of the shift valves 33 to 35 is controlled by the control unit 32 and outputs the hydraulic pressure, input through the input port, from a predetermined output port to a predetermined friction coupling element or discharge therefrom according to the selected range and the gear speed.

That is, the 1-2 shift valve 33 is provided with first and second output ports 33c and 33d as well as the aforesaid intake ports 33a and 33b. The first output port 33c is connected to the apply port 26a of the 2-4 brake 26 through an apply port hydraulic pressure passage and the second output port 33d is connected to the low and reverse brake 27 through a low and reverse brake hydraulic pressure passage 72.

The 2-3 shift valve 34 is provided with a second intake port 34b and first and second output ports 34c and 34d in addition to the aforesaid first intake port 34a. The second intake port 34b is connected to a first output port 35c of the 3-4 shift valve 35 through a first connecting passage 73, the first output port 34c is connected to the 3-4 clutch 24 through a 3-4 clutch hydraulic pressure passage 74 and the second output port 34d is connected to the coast clutch 23 by way of a second connecting passage 75, a ball valve 76 and a coast clutch hydraulic pressure passage 77. The coast clutch hydraulic pressure passage 77 is merged with a release port hydraulic pressure passage 81 near the second output port 35d.

Figure 3:
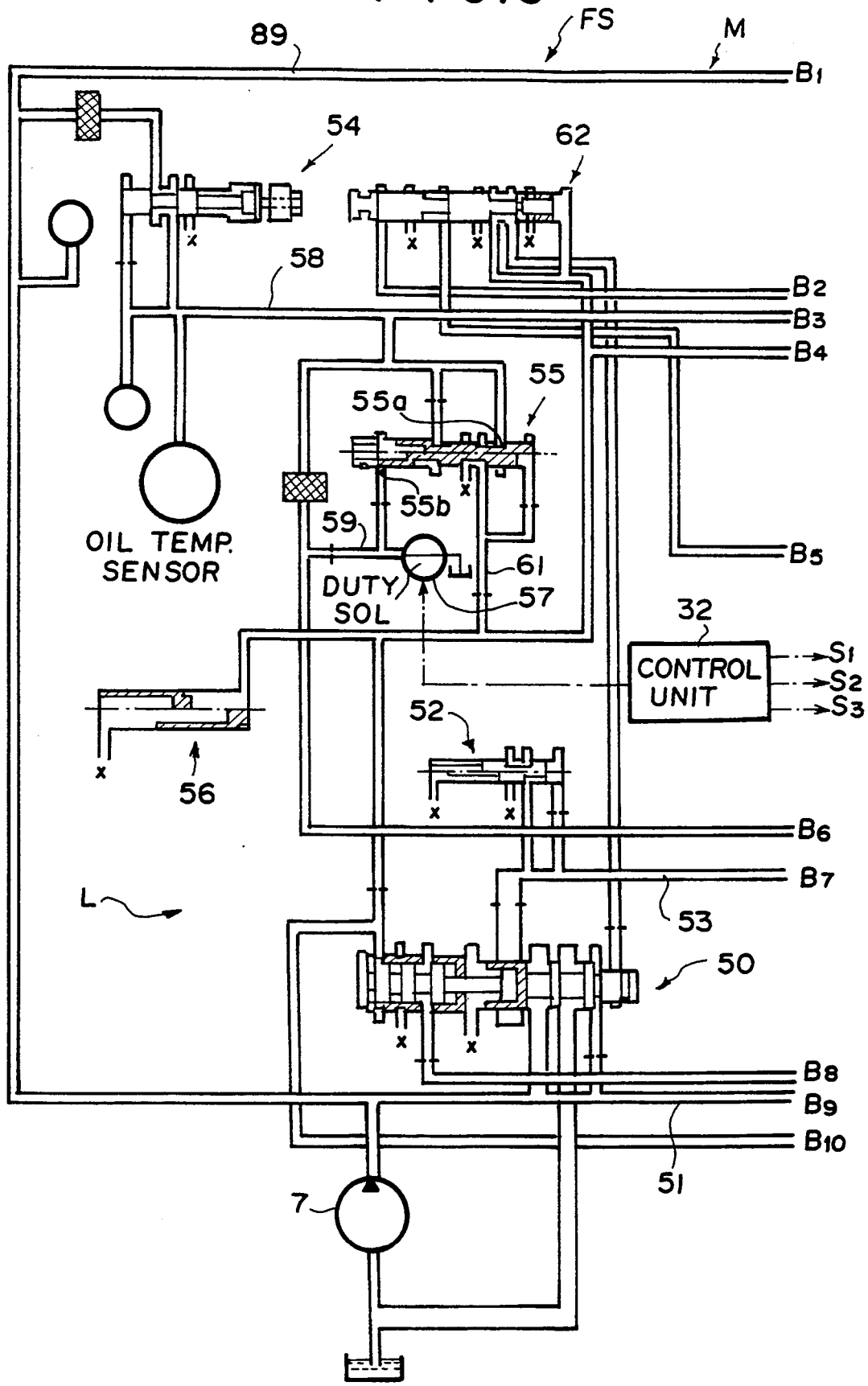
Figure 4:
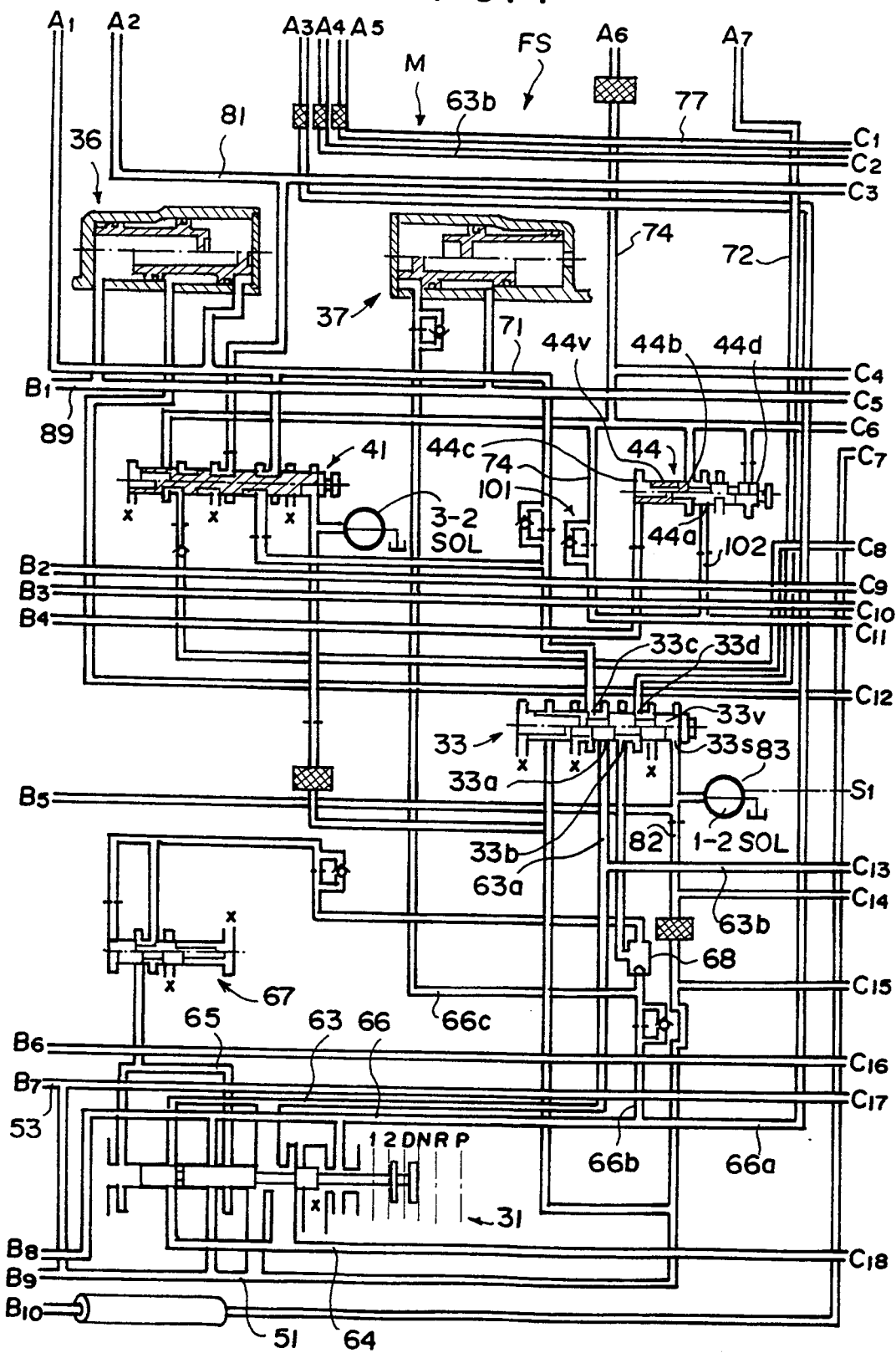
Figure 5:
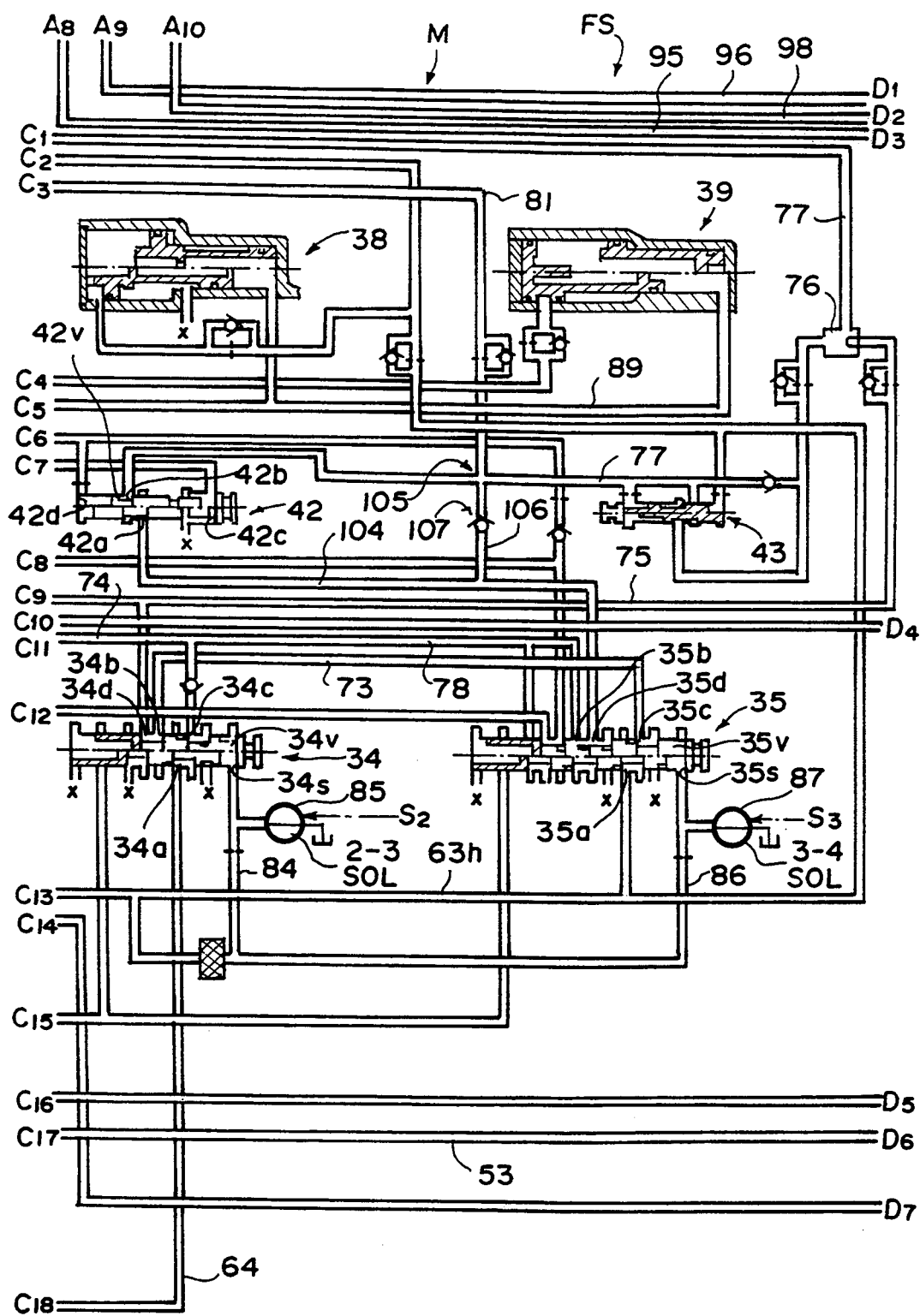
Figure 6:
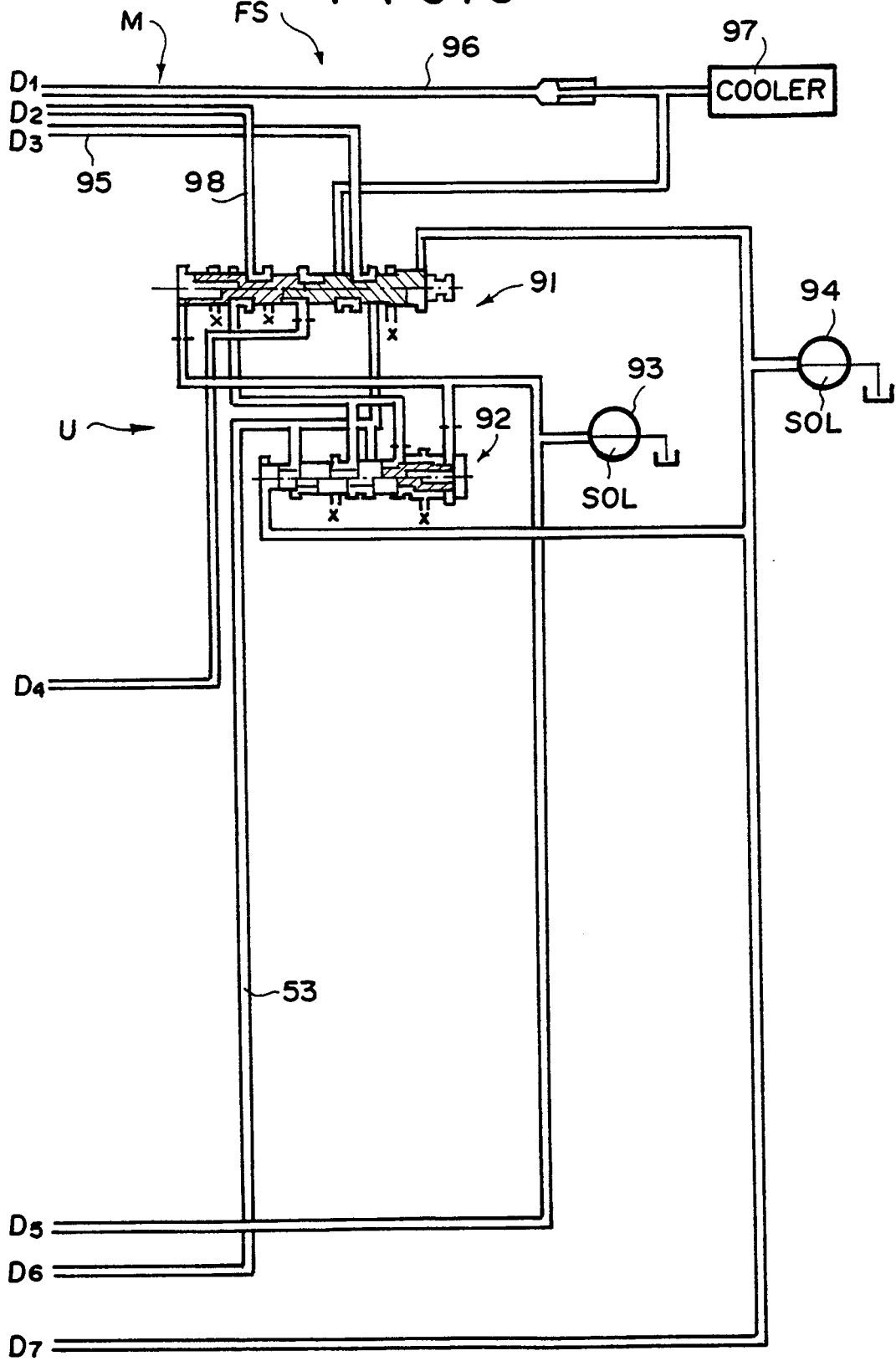

The shift valves 33, 34 and 35 respectively have valve spools 33v, 34v and 35v which are moved between an on-position and an off-position to change the hydraulic pressure transmission paths in the shift valves. The on-position is a rightward position and the off-position is a leftward position as seen in FIGS. 2 to 4. In FIGS. 2 and 3, the upper half of each of the valve spools 33v, 34v and 35v is shown in the on-position and the lower half is shown in the off-position. The shift valves 33, 34 and 35 are respectively provided with control hydraulic chambers 33s, 34s and 35s on their right end portions, and each valve spool is held in the off-position when a pilot pressure is applied to the control hydraulic chamber and in the on-position when the pilot pressure is released from the control hydraulic chamber.

A first control hydraulic pressure passage 82 branches off from the line pressure supply passage 51 and is connected to the control hydraulic chamber 33s of the 1-2 shift valve 33. The first control hydraulic pressure passage 82 is provided with a first solenoid valve 83 which is turned on and off by the control unit 32. When the first solenoid valve 83 is turned on, the pilot pressure in the first control hydraulic pressure passage 82 is released and the pilot pressure in the control hydraulic chamber 33s is released, whereby the valve spool 33v is moved to the on-position. At this time, the first output port 33c communicates with the first intake port 33a and the second output port 33d communicates with a drain (marked with x). When the first solenoid valve 83 is turned off, the pilot pressure is applied to the control hydraulic chamber 33s and the valve spool 33v is moved to the off-position. At this time, the first output port 33c communicates with a drain port and the second output port 33d communicates with the second input port 33b.

A second control hydraulic pressure passage 84 branches off from the forward clutch hydraulic pressure passage 63b and is connected to the control hydraulic chamber 34s of the 2-3 shift valve 34. The second control hydraulic pressure passage 84 is provided with a second solenoid valve 85 which is turned on and off by the control unit 32. When the second solenoid valve 85 is turned on, the valve spool 34v is moved to the on-position. At this time, the first output port 34c communicates with a drain port and the second output port 34d communicates with the second input port 34b. When the second solenoid valve 85 is turned off, the valve spool 34v is moved to the off-position. At this time, the first output port 34c communicates with the first input port 34a and the second output port 33d communicates with a drain.

A third control hydraulic pressure passage 86 branches off from the second control hydraulic pressure passage 84 and is connected to the control hydraulic chamber 35s of the 3-4 shift valve 35. The third control hydraulic pressure passage 86 is provided with a third solenoid valve 87 which is turned on and off by the control unit 32. When the third solenoid valve 87 is turned on, the valve spool 35v is moved to the on-position. At this time, the first and second output ports 35c and 35d both communicate with drain ports. When the third solenoid valve 87 is turned off, the valve spool 35v is moved to the off-position. At this time, the first output port 35c communicates with the first input port 35a and the second output port 35d communicates with the second input port 35b.

When the hydraulic pressure is abruptly applied to or released from the friction coupling elements, a shift shock occurs. In order to prevent such a shift shock, the accumulators 36 to 39 (1-2 accumulator, N-R accumulator, N-D accumulator, 2-3 accumulator) are provided respectively in the apply port hydraulic pressure passage 71, the 1-2 shift valve hydraulic pressure passage 66b, the forward clutch hydraulic pressure passage 63b and the 3-4 clutch hydraulic pressure passage 74. A back pressure passage 89 branches off from the line pressure supply passage 51 and the line pressure is applied to the respective accumulators 36 to 39 as the back pressure through the back pressure passage 89.

As will be described later, the 3-2 timing valve 41, 2-3 timing valve 42, the coast timing valve 43 and the by-pass valve 44 are provided to control the timing of on and off of the predetermined friction coupling elements so that internal lock or double lock does not occur in the transmission gear mechanism 5 when the range or the gear speed is shifted.

The lockup control mechanism U has a lockup shift valve 91, a lockup control valve 92, and first and second lockup control solenoid valves 93 and 94. The lockup control mechanism U supplies the working oil to the torque converter 3 through a working oil supply passage 95, and leads the working oil in the torque converter 3 to an oil cooler 97 through a working oil return passage 96. Further the lockup control mechanism U applies the hydraulic pressure to the lockup clutch 14, as required, through a lockup clutch hydraulic pressure passage 98.

According to the state (on or off) of the first to third solenoid valves 83, 85 and 87 which are controlled by the hydraulic control system FS and to the position of the manual valve 31, the hydraulic pressure is selectively applied or released to or from the friction coupling elements, whereby a desired range and a desired gear speed are obtained. The state of the first to third solenoid valves 83, 85 and 87 for each range and each gear speed is shown in the following table.

| range | N | | | D | | | | 2 | | | 1 | |
|---|---|---|---|---|---|---|---|---|---|---|---|---|
| | P | R | ← | → | 1 | 2 | 3 | 4 | 1 | 2 | 3 | 1 | 2 |
| 1st solenoid | X | X | X | ◯ | X | ◯ | ◯ | ◯ | X | ◯ | ◯ | X | ◯ |
| 2nd solenoid | ◯ | X | ◯ | X | ◯ | ◯ | X | ◯ | ◯ | ◯ | X | ◯ | ◯ |
| 3rd solenoid | ◯ | ◯ | X | ◯ | ◯ | ◯ | X | ◯ | ◯ | X | X | X | X |

◯ → on
X → off

In P-range of N-range, the hydraulic pressure is supplied from the manual valve 31 to none of the first to third main hydraulic pressure supply passages 63 to 65 and the reverse hydraulic pressure supply passage 66, and accordingly, the hydraulic pressure is supplied to none of the friction coupling elements irrespective of the state of the first to third solenoid valves 83, 85 and 87, whereby all the friction coupling elements are released and the transmission gear mechanism 5 is held in the neutral state.

The hydraulic pressure transmission path in the hydraulic control system FS for the respective ranges and the gear speeds will be described with reference to the above table, hereinbelow.

R range

The first and second solenoid valves 83 and 85 are turned off and the third solenoid valve 87 is turned on while the manual valve 31 is in R-range.

In this state, the hydraulic pressure is applied to the reverse clutch 25 through the reverse hydraulic pressure supply passage 66 and the first branch hydraulic pressure supply passage 66a and the reverse clutch 25 is applied. The hydraulic pressure in the reverse hydraulic pressure supply passage 66 is further applied to the low and reverse brake 27 through the 1-2 shift valve hydraulic pressure passage 66b, the second input port 33b of the 1-2 shift valve 33, the second output port 33d of the same and the low and reverse hydraulic pressure passage 72, and the low and reverse brake 27 is applied. The other friction coupling elements are released since no hydraulic pressure is applied thereto.

D-range 1) first

The manual valve 31 is in D-range and accordingly, the hydraulic pressure is supplied to the first and second main hydraulic pressure supply passages 63 and 64. This is the same for second, third and fourth in D-range which will be described later. The first solenoid valve 83 is turned off and the second and third solenoid valves 85 and 87 are turned on.

In this state, the hydraulic pressure in the first main hydraulic pressure supply passage 63 is applied to the forward clutch 21 through the forward clutch hydraulic pressure passage 63b and the forward clutch 21 is applied. The other friction coupling elements are released since any hydraulic pressure is output from none of the output ports of the shift valves 33 to 35.

2) second

All the solenoid valves 83, 85 and 87 are turned on.

In this state, the forward clutch 21 is applied as in D-range first. Further the hydraulic pressure in the first main hydraulic pressure supply passage 63 is applied to the apply port 26a of the 2-4 brake 26 through the 1-2 shift valve hydraulic pressure passage 63a, the first input port 33a and the first output port 33c of the 1-2 shift valve 33 and the apply port hydraulic pressure passage 71. Since no hydraulic pressure is applied to the release port 26b of the 2-4 brake 26, the 2-4 brake is applied. The other friction coupling elements are released since no hydraulic pressure is applied.

3) third

The first solenoid valve 83 is turned on and the second and third solenoid valves 85 and 87 are turned off.

In this state, the forward clutch 21 is applied and the hydraulic pressure is applied to the apply port 26a as in D-range second. However since the hydraulic pressure is also applied to the release port 26b as will be described later, the 2-4 brake 26 is released.

The hydraulic pressure in the second main hydraulic pressure supply passage 64 is applied to the 3-4 clutch 24 through the first input port 34a of the 2-3 shift valve 34, the first output port 34c of the same and the 3-4 clutch hydraulic pressure passage 74, and the 3-4 clutch 24 is applied. Further the hydraulic pressure in the 3-4 clutch hydraulic pressure passage 74 is applied to the coast clutch 23 through the third connecting passage 78, the second input port 35b of the 3-4 shift valve 35, the second output port 35d of the same and the coast clutch hydraulic pressure passage 77, and the coast clutch 23 is applied. Further the hydraulic pressure at the second output port 35d is applied to the release port 26b of the 2-4 brake 26 through the release port hydraulic pressure passage 81 and the 2-4 brake 26 is released. The reverse clutch 25 and the low and reverse brake 27 are applied with no hydraulic pressure and are released.

4) fourth

The first and third solenoid valves 83 and 87 are turned on, and the second solenoid valve 85 is turned off.

In this state, the forward clutch 21 and the 2-4 brake 26 are applied as in D-range second. Further the 3-4 clutch 24 is applied as in D-range third. The other friction coupling elements are applied with no hydraulic pressure and are released.

2-range 1) first

Though the manual valve 31 is in 2-range, the hydraulic pressure transmission paths for the friction coupling elements are the same in D-range first.

2) second

The first and second solenoid valves 83 and 85 are turned on, and the third solenoid valve 87 is turned off.

In this state, the forward clutch 21 and the 2-4 brake 26 are applied as in D-range second. Further the hydraulic pressure in the forward clutch hydraulic pressure passage 63b is applied to the coast clutch 23 through the first input port 35a of the 3-4 shift valve 35, the first output port 35c of the same, the first connecting passage 73, the second input port 34b of the 2-3 shift valve 34, the second output port 34d of the same, the second connecting passage 75, the ball valve 76 and the coast clutch hydraulic pressure passage 77, and the coast clutch 23 is applied. The other friction coupling elements are applied with no hydraulic pressure and are released.

3) third

The same as in D-range third.

1-range 1) first

The manual valve 31 is in 1-range and the hydraulic pressure is supplied to the first and third main hydraulic pressure supply passages 63 and 65. The first and third solenoid valves 83 and 87 are turned off and the second solenoid valve 85 is turned on.

In this state, the forward clutch 21 is applied as in D-range first, and the coast clutch 23 is applied as in 2-range second. Further the hydraulic pressure in the third main hydraulic pressure supply passage 65 is applied to the low and reverse brake 27 through the low reducing valve 67, the ball valve 68, the 1-2 shift valve hydraulic pressure passage 66b, the second input port 33b of the 1-2 shift valve 33, the second output port 33d of the same and the low and reverse brake hydraulic pressure passage 72, and the low and reverse brake 27 is applied. The other friction coupling elements are applied with no hydraulic pressure and are released.

2) second

Though the manual valve 31 is in 1-range, the hydraulic pressure transmission paths for the friction coupling elements are the same in 2-range second.

The hydraulic control system FS is provided with the timing valves 41 to 43 and the bypass valve 44 which control the timing of on and off of the predetermined friction coupling elements so that internal lock or double lock does not occur in the transmission gear mechanism 5 when the range or the gear speed is shifted.

The bypass valve 44 is provided in a first bypass hydraulic pressure passage 102 which bypasses a one-way orifice 101 in the 3-4 clutch hydraulic pressure passage 74. The bypass valve 44 has a valve spool 44v, an input port 44a which is connected to the first bypass hydraulic pressure passage 102 upstream of the valve spool 44v, an output port 44b which is connected to the first bypass hydraulic pressure passage 102 downstream of the valve spool 44v, a pilot hydraulic pressure chamber 44c into which the pilot pressure in the pilot pressure passage 61 is introduced, and a control hydraulic pressure chamber 44d into which the hydraulic pressure in the 3-4 clutch hydraulic pressure passage 74 downstream of the one-way orifice 101 is introduced.

In normal upshift from second to third in D-range, the hydraulic pressure is quickly supplied to the 3-4 clutch 24 through the first bypass hydraulic pressure passage 102 at the beginning since the valve spool 44v has been pushed rightward and the input port 44a and the output port 44b have communicated with each other. When the hydraulic pressure in the 3-4 clutch hydraulic pressure passage 74 downstream of the one-way orifice 101, i.e., the hydraulic pressure applied to the 3-4 clutch 24, increases above a predetermined value, the valve spool 44v is moved leftward under the pressure in the control hydraulic pressure chamber 44d, and the communication between the input port 44a and the output port 44b is broken. In this state, the hydraulic pressure is relatively slowly supplied to the 3-4 clutch 24 through the 3-4 clutch hydraulic pressure passage 74 in which the one-way orifice 101 is provided. In this manner, the hydraulic pressure supplying characteristics to the 3-4 clutch 24 is controlled by the bypass valve 44.

An integrated hydraulic pressure passage 104 is connected to the second output port 35d of the 3-4 shift valve 35. The integrated hydraulic pressure passage 104 branches out into the release port hydraulic pressure passage 81 and the coast clutch hydraulic pressure passage 77 downstream of a junction 105. The 2-3 timing valve 42 is provided in the integrated hydraulic pressure passage 104. A second bypass hydraulic pressure passage 106 bypasses the 2-3 timing valve 42 and is provided with a one-way valve 107. The 2-3 timing valve 42 has a valve spool 42v, an input port 42a which is connected to the integrated hydraulic pressure passage 104 upstream of the valve spool 42v, an output port 42b which is connected to the integrated hydraulic pressure passage 104 downstream of the valve spool 42v, a pilot hydraulic pressure chamber 42c into which the pilot pressure in the pilot pressure passage 61 is introduced, and a control hydraulic pressure chamber 42d into which the hydraulic pressure in the 3-4 clutch hydraulic pressure passage 74 is introduced. The 3-4 clutch 24 and the 2-4 brake 26 are applied and released at proper timings so that engaging shock or internal locking does not occur.

The coast timing valve 43 is provided in the coast clutch hydraulic pressure passage 77 and causes the coast clutch 23 to be applied after release of the 2-4 brake 26 to prevent occurrence of internal locking. The 3-2 timing valve 41 adjusts timing of application and release of the 2-4 brake 26 and the like upon downshift from third to second.

The control unit 32 and the line pressure control mechanism L control the line pressure in the line pressure supply passage 51 to a predetermined value. When the transmission gear mechanism 5 is to shift, the control unit 32 sets the target value of the line pressure to a proper value according to the throttle opening TVO and the kind of gear-shifting. In accordance with the present invention, in the case of backout or back torque shift, the control unit 32 corrects the target value of the line pressure according to the throttle opening and the turbine speed so that an optimal line pressure is obtained and a given gear-shifting can be made without shift shock or extension of the shifting time irrespective of the kind of the gear-shifting.

Though the target value of the line pressure may be corrected solely according to the throttle opening and the turbine speed, it is preferred that the control unit 32 corrects the target value of the line pressure further according to the kind of the backout shift.

The kinds of the backout shifts may be divided, for instance, according to the gear speeds before and after the backout shift, or to the gear speed after the backout shift or the friction coupling element(s) which is applied in the backout shift.

Figure 7:
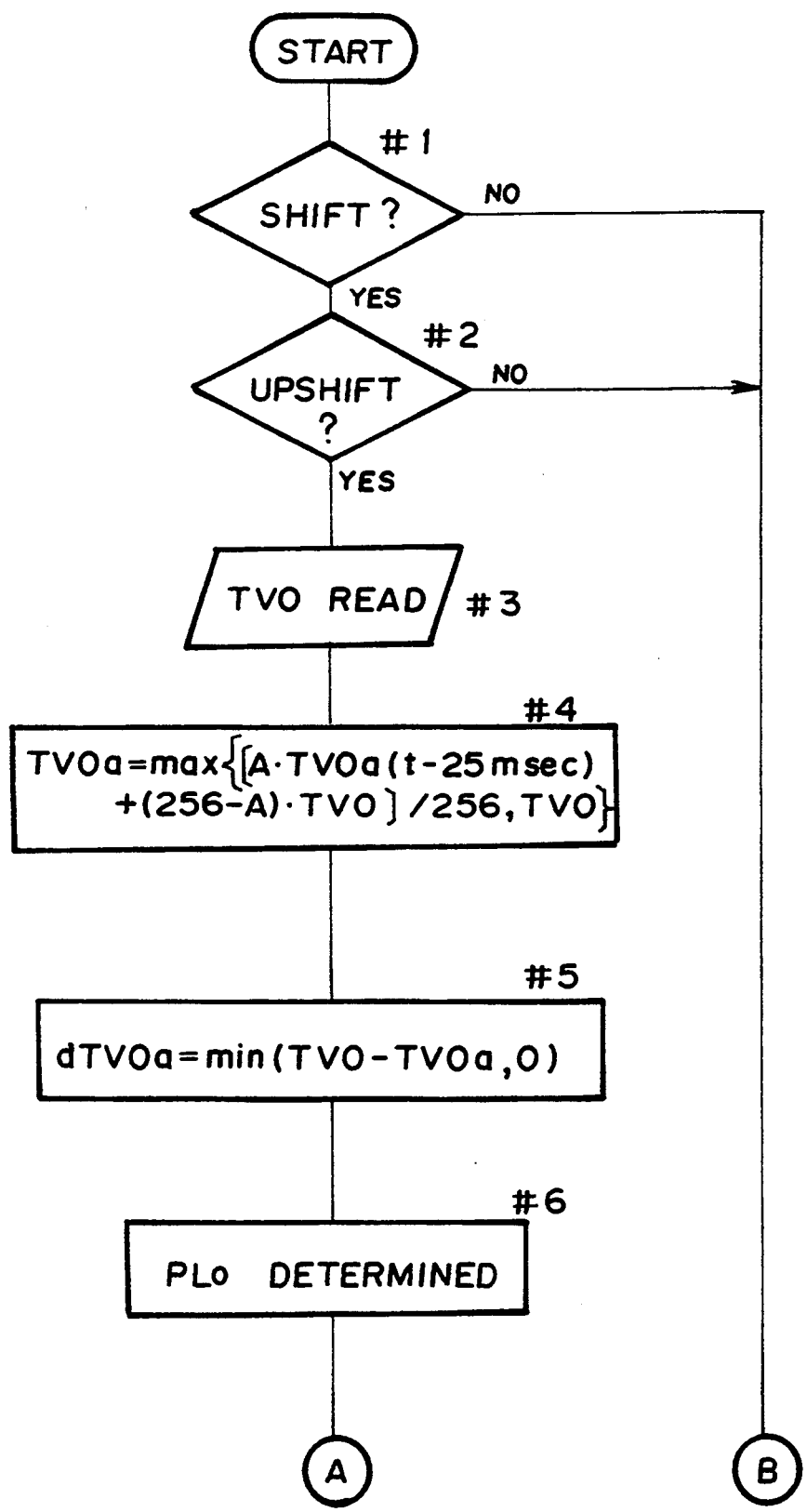
FIGS. 7 and 8 are flow charts for illustrating the operation of the control unit in accordance with a first embodiment of the present invention.
Figure 8:
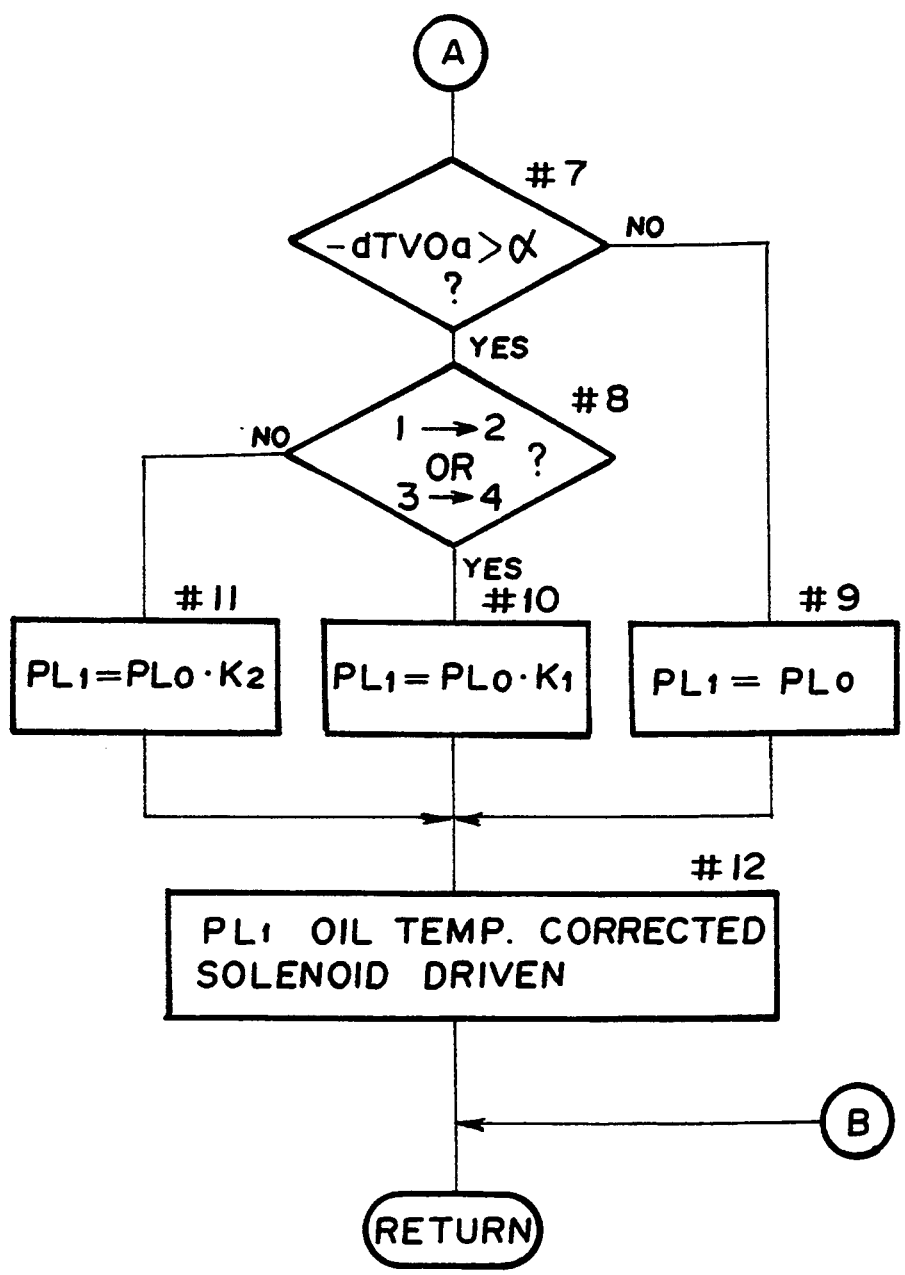

FIGS. 7 and 8 show a flow chart for illustrating a line pressure control routine which the control unit 32 executes upon a backout shift in accordance with a first embodiment of the present invention. Though will not be described here, the line pressure may be controlled according to any of the known methods when the transmission gear mechanism 5 is held in a certain gear speed or is to downshift.

In step S1, the control unit 32 first determines whether an upshift is to be made (steps #1 and #2).

When it is determined that an upshift is to be made, the control unit 32 reads the throttle opening TVO in step #3 and calculates a dulled throttle opening TVOa according to the following formula (1) in step #4.

$$TVOa = max\{[A \cdot TVOa(t-25 \text{ msec}) + (256-A) \cdot TVO]/256, TVO\} \quad (1)$$

wherein TVOa(t−25 msec) represents the value of the TVOa 25 msec before, i.e., the last value of the TVOa, max{ } represents the largest of the elements in {}, and A represents a dulling constant not smaller than 0 and not larger than 256.

Then the control unit 32 calculates the rate of change dTVOa of the throttle opening according to the following formula (2) in step #5.

$$dTVOa = min(TVO - TVOa, 0) \quad (2)$$

wherein min( ) represents the smallest of the elements in ( ).

Figures 12, 13:
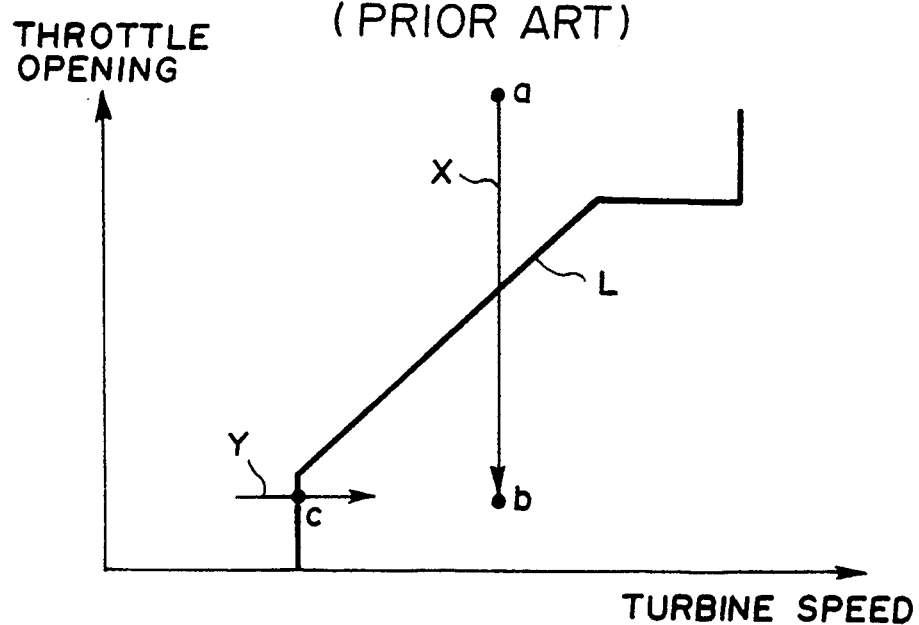
FIG. 12 is a line pressure control map.
FIG. 13 is a view showing an example of an upshift line.

In step #6, the control unit 32 determines a basic target line pressure PLo on the basis of the kind of the upshift to be made according to the line pressure control map such as shown in FIG. 12. In the map shown in FIG. 12, the kinds of the upshifts are divided according to the gear speed after the shift, i.e., upshift from first to second, upshift from first or second to third, and upshift from first, second or third to fourth. By dividing the kinds of the upshifts in this manner, the capacity of the memory for the line pressure control map can be minimized and the control unit 32 can be small in size and can be simplified. The kinds of the upshifts may be more finely divided into six, i.e., 1→2, 1→3, 1→4, 2→3, 2→4, 3→4.

The line pressure control map is set so that the basic target line pressure PLo as read out therefrom (without correction) is proper for a normal upshift due to increase in the turbine speed.

In step #7 (FIG. 8), the control unit 32 determines whether the throttle valve is being closed at a rate larger than a predetermined speed, that is, −dTVOa is larger than a predetermined value $\alpha$ (>0). In this embodiment, when −dTVOa is larger than the predetermined value $\alpha$ (>0), the control unit 32 determines that the upshift to be made is a backout shift.

When it is determined that −dTVOa is not larger than the predetermined value $\alpha$ in step #7, the control unit 32 sets the basic target line pressure PLo as read out from the line pressure control map as a final target line pressure PL1. (step #9) That is, the basic target line pressure PLo read out from the line pressure control map is not corrected.

When it is determined in step #7 that −dTVOa is larger than the predetermined value $\alpha$, the control unit 32 corrects the basic target line pressure PLo read out from the line pressure control map according to the kind of the upshift, the turbine speed Nt and throttle opening TVO.

That is, the control unit 32 determines in step #8 whether the upshift is one of 1-2 upshift and 3-4 upshift.

In this embodiment, the kinds of backout shifts are divided into first and second pattern backout shifts according to the friction coupling elements to be applied. That is, in the case of 1-2 upshift and 3-4 upshift, the 2-4 brake 26 is applied and in the case of the other upshifts, i.e., 1-3 upshift, 1-4 upshift, 2-3 upshift and 2-4 upshift, the 3-4 clutch 24 is applied. The former upshifts are divided as the first pattern upshift and the latter upshifts are divided as the second pattern upshift. Though both the 2-4 brake 26 and the 3-4 clutch 24 are applied in the case of 1-4 upshift, the 1-4 upshift is divided as the second pattern upshift in this embodiment. When the friction coupling element to be applied is the same, the desired line pressure is substantially the same irrespective of the gear speeds before and after the upshift. Accordingly, by dividing the kinds of backout shifts in this manner, an optimal line pressure can be obtained. Since the number of the kinds of backout shift is small, the capacity of the memory for the line pressure control map can be minimized and the control unit 32 can be small in size and can be simplified.

When it is determined that the upshift is one of 1-2 upshift and 3-4 upshift or the first pattern upshift, the control unit 32 corrects, in step #10, the basic target line pressure PLo according to the following formula (3), thereby calculating the final target line pressure PL1.

$$PL1 = PLo \times K1 \tag{3}$$

wherein K1 is a first correction coefficient which is used for correcting the basic target line pressure PLo in the case of the first pattern backout shift and is determined on the basis of the throttle opening TVO and the turbine speed Nt according to the correction coefficient map shown in FIG. 10A.

When it is determined in step #8 that the upshift is none of 1-2 upshift and 3-4 upshift, that is, the upshift is the second pattern upshift, the control unit 32 corrects, in step #11, the basic target line pressure PLo according to the following formula (4), thereby calculating the final target line pressure PL1.

$$PL1 = PLo \times K2 \tag{4}$$

wherein K2 is a second correction coefficient which is used for correcting the basic target line pressure PLo in the case of the second pattern backout shift and is determined on the basis of the throttle opening TVO and the turbine speed Nt according to the correction coefficient map shown in FIG. 10B.

Then the control unit 32 corrects the final target line pressure PL1 determined in step #9, #10 or #11 with the oil temperature and the like, and determines the duty ratio and the driving frequency of the line pressure controlling solenoid valve 57. Further the control unit 32 calculates the on-time in one cycle of the line pressure controlling solenoid valve 57 on the basis of the duty ratio and the driving cycle which is the reciprocal of the driving frequency, and drives the line pressure controlling solenoid valve 57 according to the on-time. (step #12)

In the friction coefficient maps shown in FIGS. 10A and 10B, the basic target line pressure PLo is corrected only in the range where the throttle opening TVO is not smaller than 0/8 and not larger than 2/8, and is not corrected when the throttle opening TVO is larger than 2/8. This is because the turbine speed Nt at a backout shift is greatly larger than that at a normal upshift when the throttle opening TVO is small but the difference between the former and the latter is very small when the throttle opening TVO is large as can be understood from the shift line L shown in FIG. 13. By limiting the range where the correction of the line pressure is to be made, the capacity of the memory for the correction coefficient map can be minimized and the control unit 32 can be small in size and can be simplified.

Figure 9:
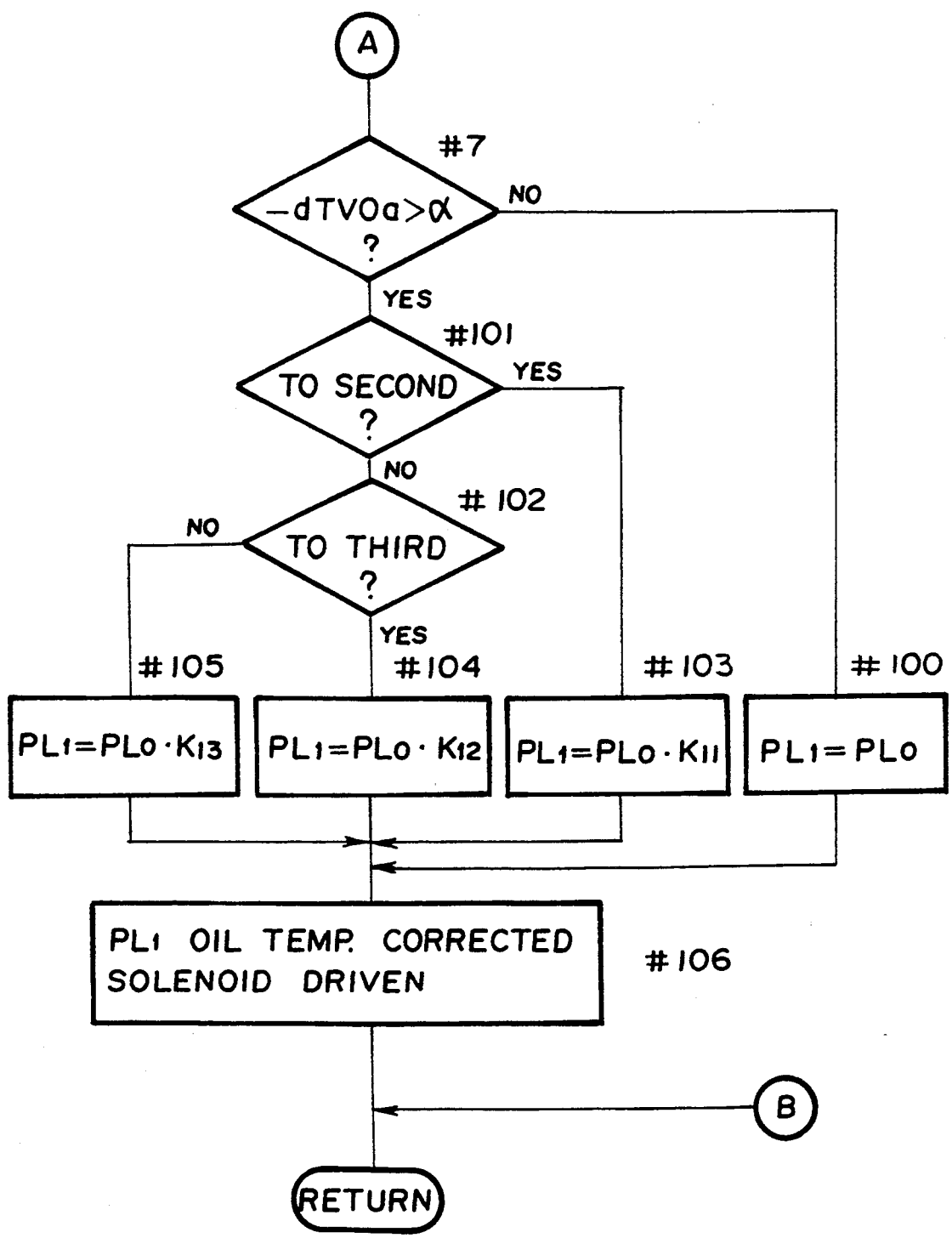
FIG. 9 is a flow chart for illustrating the operation of the control unit in accordance with a second embodiment of the present invention.

Now another example of the line pressure control routine which the control unit 32 executes upon a backout shift in accordance with a second embodiment of the present invention will be described with reference to FIG. 9.

The second embodiment differs from the first embodiment in the manner of dividing the kinds of backout shift. That is, in the second embodiment, the backout shifts are divided into three by the gear speed after the upshift, that is, an upshift to second from first, an upshift to third from first or second and an upshift to fourth from first, second or third. When the gear speed after the upshift is the same, the desired line pressure is substantially the same irrespective of the gear speed before the upshift.

In the line pressure control routine in the second embodiment, the same steps as the steps #1 to #7 shown in FIG. 7 are first executed. When it is determined in step #7 that $-dTVOa$ is not larger than the predetermined value $\alpha$, the control unit 32 sets the basic target line pressure PLo as read out from the line pressure control map as a final target line pressure PL1. (step #9) When it is determined in step #7 that $-dTVOa$ is larger than the predetermined value $\alpha$, the control unit 32 determines the gear speed to which the transmission gear mechanism 5 is to shift. When it is determined that the transmission gear mechanism 5 is to shift to second, the control unit 32 corrects the basic target line pressure PLo according to the following formula (5), thereby calculating the final target line pressure PL1.

$$PL1 = PLo \times K11 \tag{5}$$

wherein K11 is a correction coefficient which is used for correcting the basic target line pressure PLo in the case of the backout shift to second and is determined on the basis of the throttle opening TVO and the turbine speed Nt according to the correction coefficient map shown in FIG. 11A. When it is determined that the transmission gear mechanism 5 is to shift to third, the control unit 32 corrects the basic target line pressure PLo according to the following formula (6), thereby calculating the final target line pressure PL1.

$$PL1 = PLo \times K12 \tag{6}$$

wherein K12 is a correction coefficient which is used for correcting the basic target line pressure PLo in the case of the backout shift to third and is determined on the basis of the throttle opening TVO and the turbine speed Nt according to the correction coefficient map shown in FIG. 11B. When it is determined that the transmission gear mechanism 5 is to shift to fourth, the control unit 32 corrects the basic target line pressure PLo according to the following formula (7), thereby calculating the final target line pressure PL1.

$$PL1 = PLo \times K13 \tag{7}$$

wherein K13 is a correction coefficient which is used for correcting the basic target line pressure PLo in the case of the backout shift to fourth and is determined on the basis of the throttle opening TVO and the turbine speed Nt according to the correction coefficient map shown in FIG. 11C.

Then the control unit 32 performs step #106 which is similar to step #12 in FIG. 8.

Though, in the first and second embodiments described above, the correction coefficient is determined according to the kind of the backout shift in addition to the throttle opening TVO and the turbine speed Nt, it may be determined solely according to the throttle opening TVO and the turbine speed Nt independently from the kind of the backout shift.

What is claimed is:

1. A hydraulic control system for an automatic transmission including a multi-speed transmission gear mechanism having an input shaft, an output shaft and a plurality of friction coupling elements, the hydraulic control system being for selectively applying and releasing the friction coupling elements to cause the transmission gear mechanism to shift to a speed which is determined according to a predetermined shift pattern, and comprising a hydraulic circuit for supplying a hydraulic pressure to the friction coupling elements and applying the friction coupling elements and a control means which controls the hydraulic circuit, characterized in that said control means is provided with a target hydraulic pressure setting means which sets a target hydraulic pressure to be applied to the friction coupling elements according to a kind of shift to be effected and load on the engine of a vehicle, an engine load detecting means which detects a parameter indicative of the engine load and another parameter indicative of the rate of change in the engine load a back torque shift detecting means which detects that the transmission gear mechanism is to make a back torque upshift due to a reduction in said another parameter indicative of the rate of change in the engine load by a predetermined amount, a rotational speed detecting means which detects a rotational speed of a driving system which drives the input shaft of the transmission gear mechanism, and a correcting means, when the back torque shift detecting means detects that the transmission gear mechanism is to make said back torque upshift increases the target hydraulic pressure set by the target hydraulic pressure setting means by an amount which is determined according to said parameter indicative of the engine load and the rotational speed of the driving system:

wherein said rotational speed detecting means detects the rotational speed of a turbine of a torque convertor as the rotational speed of the driving system, and said correction means determines the amount by which the target hydraulic pressure set by the target hydraulic pressure setting means is increased according to the kind of the back torque upshift as well as to said parameter indicative of the engine load and the rotational speed of the driving system.

2. A hydraulic control system as defined in claim 1 in which said back torque shifts are divided into a plurality of kinds by the friction coupling element to be applied in the back torque shift.

3. A hydraulic control system as defined in claim 2 in which said back torque shifts are divided into a two kinds, one consisting of the back torque upshifts in which a 2-4 brake is applied and the other consisting of the back torque shifts in which a 3-4 clutch is applied.

4. A hydraulic control system as defined in claim 2 in which said back torque shifts are divided into a plurality of kinds by the gear speed to which the transmission gear mechanism is to shift.

5. A hydraulic control system as defined in claim 4 in which said back torque upshifts are divided into three kinds, one consisting of the backout upshifts in which the transmission gear mechanism shifts to second, another consisting of the back torque upshifts in which the transmission gear mechanism shifts to third and the other consisting of the back torque upshifts in which the transmission gear mechanism shifts to fourth.

6. A hydraulic control system for an automatic transmission including a multi-speed transmission gear mechanism having an input shaft, an output shaft and a plurality of friction coupling elements, the hydraulic control system being for selectively applying and releasing the friction coupling elements to cause the transmission gear mechanism to shift to a speed which is determined according to a predetermined shift pattern, and comprising a hydraulic circuit for supplying a hydraulic pressure to the friction coupling elements and applying the friction coupling elements and a control means which controls the hydraulic circuit, characterized in that said control means is provided with a target hydraulic pressure setting means which sets a target hydraulic pressure to be applied to the friction coupling elements according to a kind of shift to be effected and load on the engine of a vehicle, an engine load detecting means which detects a parameter indicative of the engine load and another parameter indicative of the rate of change in the engine load a back torque shift detecting means which detects that the transmission gear mechanism is to make a back torque upshift due to a reduction in said another parameter indicative of the rate of change in the engine load by a predetermined amount, a rotational speed detecting means which detects a rotational speed of a driving system which drives the input shaft of the transmission gear mechanism, and a correcting means, when the back torque shift detecting means detects that the transmission gear mechanism is to make said back torque upshift increases the target hydraulic pressure set by the target hydraulic pressure setting means by an amount which is determined according to said parameter indicative of the engine load and the rotational speed of the driving system:

wherein said correction means determines the amount by which the target hydraulic pressure set by the target hydraulic pressure setting means is increased according to the kind of the back torque upshift as well as to the said parameter indicative of the engine load and the rotational speed of the driving system.

7. A hydraulic control system as defined in claim 6 in which said back torque shifts are divided into a plurality of kinds by the friction coupling element to be applied in the back torque shift.

8. A hydraulic control system as defined in claim 7 in which said back torque shifts are divided into two kinds, one consisting of the back torque upshifts in which a 2-4 brake is applied and the other consisting of the back torque shifts in which a 3-4 clutch is applied.

9. A hydraulic control system as defined in claim 7 in which said back torque shifts are divided into a plurality of kinds by the gear speed to which the transmission gear mechanism is to shift.

10. A hydraulic control system as defined in claim 9 in which said back torque upshifts are divided into three kinds, one consisting of the back torque upshifts in which the transmission gear mechanism shifts to second, another consisting of the back torque upshifts in which the transmission gear mechanism shifts to third and the other consisting of the back torque upshifts in which the transmission gear mechanism shifts to fourth.

11. A hydraulic control system for an automatic transmission including a multi-speed transmission gear mechanism having an input shaft, an output shaft and a plurality of friction coupling elements, the hydraulic control system being for selectively applying and releasing the friction coupling elements to cause the transmission gear mechanism to shift to a speed which is determined according to a predetermined shift pattern, and comprising a hydraulic circuit for supplying a hydraulic pressure to the friction coupling elements and applying the friction coupling elements and a control means which controls the hydraulic circuit, characterized in that said control means is provided with a target hydraulic pressure setting means which sets a target hydraulic pressure to be applied to the friction coupling elements according to a kind of shift to be effected and load on the engine of a vehicle, an engine load detecting means which detects a parameter indicative of the engine load and another parameter indicative of the rate of change in the engine load a back torque shift detecting means which detects that the transmission gear mechanism is to make a back torque upshift due to a reduction in said another parameter indicative of the rate of change in the engine load by a predetermined amount, a rotational speed detecting means which detects a rotational speed of a driving system which drives the input shaft of the transmission gear mechanism, and a correcting means, when the back torque shift detecting means detects that the transmission gear mechanism is to make said back torque upshift increases the target hydraulic pressure set by the target hydraulic pressure setting means by an amount which is determined according to said parameter indicative of the engine load and the rotational speed of the driving system:

wherein said rotational speed detecting means detects the rotational speed of a turbine of a torque convertor as the rotational speed of the driving system and said correction means increases the target hydraulic pressure only when the engine load is in a predetermined range.

12. A hydraulic control system as defined in claim 11 in which said back torque shifts are divided into a plurality of kinds by the friction coupling element to be applied in the back torque shift.

13. A hydraulic control system as defined in claim 12 in which said back torque shifts are divided into two kinds, one consisting of the back torque upshifts in which a 2-4 brake is applied and the other consisting of the back torque shifts in which a 3-4 clutch is applied.

14. A hydraulic control system as defined in claim 12 in which said back torque shifts are divided into a plurality of kinds by the gear speed to which the transmission gear mechanism is to shift.

15. A hydraulic control system as defined in claim 14 in which said back torque upshifts are divided into three kinds, one consisting of the back torque upshifts in which the transmission gear mechanism shifts to second, another consisting of the back torque upshifts in which the transmission gear mechanism shifts to third and the other consisting of the back torque upshifts in which the transmission gear mechanism shifts to fourth.

16. A hydraulic control system for an automatic transmission including a multi-speed transmission gear mechanism having an input shaft, an output shaft and a plurality of friction coupling elements, the hydraulic control system being for selectively applying and releasing the friction coupling elements to cause the transmission gear mechanism to shift to a speed which is determined according to a predetermined shift pattern, and comprising a hydraulic circuit for supplying a hydraulic pressure to the friction coupling elements and applying the friction coupling elements and a control means which controls the hydraulic circuit, characterized in that said control means is provided with a target hydraulic pressure setting means which sets a target hydraulic pressure to be applied to the friction coupling elements according to a kind of shift to be effected and load on the engine of a vehicle, an engine load detecting means which detects a parameter indicative of the engine load and another parameter indicative of the rate of change in the engine load a back torque shift detecting means which detects that the transmission gear mechanism is to make a back torque upshift due to a reduction in said another parameter indicative of the rate of change in the engine load by a predetermined amount, a rotational speed detecting means which detects a rotational speed of a driving system which drives the input shaft of the transmission gear mechanism, and a correcting means, when the back torque shift detecting means detects that the transmission gear mechanism is to make said back torque upshift increases the target hydraulic pressure set by the target hydraulic pressure setting means by an amount which is determined according to said parameter indicative of the engine load and the rotational speed of the driving system:

wherein said correction means increases the target hydraulic pressure only when the engine load is in a predetermined range.

17. A hydraulic control system as defined in claim 16 in which said back torque shifts are divided into a plurality of kinds by the friction coupling element to be applied in the back torque shift.

18. A hydraulic control system as defined in claim 17 in which said back torque shifts are divided into two kinds, one consisting of the back torque upshifts in which a 2-4 brake is applied and the other consisting of the back torque shifts in which a 3-4 clutch is applied.

19. A hydraulic control system as defined in claim 17 in which said back torque shifts are divided into a plurality of kinds by the gear speed to which the transmission gear mechanism is to shift.

20. A hydraulic control system as defined in claim 19 in which said back torque upshifts are divided into three kinds, one consisting of the back torque upshifts in which the transmission gear mechanism shifts to second, another consisting of the back torque upshifts in which the transmission gear mechanism shifts to third and the other consisting of the back torque upshifts in which the transmission gear mechanism shifts to fourth.

21. A hydraulic control system for an automatic transmission including a multi-speed transmission gear mechanism having an input shaft, an output shaft and a plurality of friction coupling elements, the hydraulic control system being for selectively applying and releasing the friction coupling elements to cause the transmission gear mechanism to shift to a speed which is determined according to a predetermined shift pattern, and comprising a hydraulic circuit for supplying a hydraulic pressure to the friction coupling elements and applying the friction coupling elements and a control means which controls the hydraulic circuit, characterized in that said control means is provided with a target hydraulic pressure setting means which sets a target hydraulic pressure to be applied to the friction coupling elements according to a kind of shift to be effected and a degree of opening of a throttle valve for an engine throttle valve detecting means which detects a parameter indicative of the degree of opening of the throttle valve and another parameter indicative of the rate of change in the degree of opening of the throttle valve, a back torque shift detecting means which detects that the transmission gear mechanism is to make a back torque upshift due to a reduction in of said another parameter indicative of the rate of change in the degree of opening of the throttle valve the degree of opening of the throttle valve at a rate not less than a predetermined rate, a rotational speed detecting means which detects a rotational speed of a driving system which drives the input shaft of the transmission gear mechanism, and a correcting means which, when the back torque shift detecting means detects that the transmission gear mechanism is to make said back torque upshift increases the target hydraulic pressure set by the target hydraulic pressure setting means by an amount which is determined according to said parameter indicative of the degree of opening of the throttle valve and the rotational speed of the driving system, and does not correct the target hydraulic pressure when the back torque upshift is not detected.

22. A hydraulic control system as defined in claim 21 in which said shifts are divided into a plurality of kinds by the friction coupling element to be applied in the shift.

23. A hydraulic control system as defined in claim 22 in which said upshifts are divided into two kinds, one consisting of the upshifts in which a 2-4 brake is applied and the other consisting of the shifts in which a 3-4 clutch is applied.

24. A hydraulic control system as defined in claim 22 in which said shifts are divided into a plurality of kinds by the gear speed to which the transmission gear mechanism is to shift.

25. A hydraulic control system as defined in claim 24 in which said upshifts are divided into three kinds, one consisting of the upshifts in which the transmission gear mechanism shifts to second, another consisting of the upshifts in which the transmission gear mechanism shifts to third and the other consisting of the upshifts in which the transmission gear mechanism shifts to fourth.

* * * * *